United States Patent
Said et al.

(10) Patent No.: US 11,526,915 B2
(45) Date of Patent: Dec. 13, 2022

(54) AUTOMATED VALUE DETERMINATION SYSTEM

(71) Applicant: Opendoor Labs Inc., San Francisco, CA (US)

(72) Inventors: Chris Said, San Francisco, CA (US); Lei Du, San Francisco, CA (US); Xinlu Huang, Palo Alto, CA (US); David Makanalani Lundgren, San Francisco, CA (US); Zainul Shah, San Francisco, CA (US)

(73) Assignee: Opendoor Labs Inc., San Francisco, CA (US)

( * ) Notice: Subject to any disclaimer, the term of this patent is extended or adjusted under 35 U.S.C. 154(b) by 321 days.

(21) Appl. No.: 16/176,983

(22) Filed: Oct. 31, 2018

(65) Prior Publication Data

US 2020/0134677 A1   Apr. 30, 2020

(51) Int. Cl.
*G06Q 30/02*   (2012.01)
*G06Q 50/16*   (2012.01)

(52) U.S. Cl.
CPC ....... *G06Q 30/0278* (2013.01); *G06Q 50/167* (2013.01)

(58) Field of Classification Search
CPC .......................... G06Q 30/0278; G06Q 50/167
USPC ........................................................ 705/316
See application file for complete search history.

(56) References Cited

U.S. PATENT DOCUMENTS

| | | | | |
|---|---|---|---|---|
| 6,115,694 | A  * | 9/2000 | Cheetham | G06Q 30/06 705/7.35 |
| 11,232,500 | B1 * | 1/2022 | Van Dyne | G06Q 50/16 |
| 2008/0033747 | A1 * | 2/2008 | Stickleman | G06Q 30/0601 705/26.1 |
| 2008/0162224 | A1 * | 7/2008 | Coon | G06Q 10/0639 705/7.38 |
| 2011/0125783 | A1 * | 5/2011 | Whale | G06F 16/93 707/769 |
| 2014/0258042 | A1 * | 9/2014 | Butler | G06Q 50/16 705/26.63 |

(Continued)

OTHER PUBLICATIONS https://www.masslive.com/homebuying/2017/02/maybe_for_sale_signs_a_seller.html (Year: 2017).*

(Continued)

*Primary Examiner* — Luna Champagne
(74) *Attorney, Agent, or Firm* — Schwegman Lundberg & Woessner, P.A.

(57) ABSTRACT

Systems and methods are disclosed for receiving, from a client device, a request to generate a value for a subject real-estate property, searching a database to identify a plurality of real-estate properties that have previously been sold, and automatically generating, based on a sale price of each of the plurality of real-estate properties, the value for the subject real-estate property. The systems and methods further provide for computing a collective physical state of the plurality of real-estate properties, determining whether the collective physical state corresponds to a threshold, and generating a prompt, based on the determination of whether the collective physical state corresponds to the threshold, for display on an operator device to review the automatically generated value before the value is presented to the client device.

19 Claims, 9 Drawing Sheets

(56) References Cited

U.S. PATENT DOCUMENTS

| | | | | |
|---|---|---|---|---|
| 2015/0154663 A1* | 6/2015 | Willard | ................. | G06Q 50/16 |
| | | | | 705/306 |
| 2015/0154664 A1* | 6/2015 | Dawson | ............. | G06Q 30/0278 |
| | | | | 705/306 |
| 2015/0170301 A1* | 6/2015 | Dickson | ................ | G06F 16/951 |
| | | | | 707/734 |
| 2015/0302419 A1* | 10/2015 | Obrecht | ............... | G06Q 30/018 |
| | | | | 705/313 |
| 2016/0292800 A1* | 10/2016 | Smith | .................... | G06Q 50/16 |
| 2017/0270580 A1* | 9/2017 | Esposito | ............ | G06Q 30/0613 |
| 2018/0033102 A1* | 2/2018 | Duault | .................. | G06Q 50/16 |

OTHER PUBLICATIONS https://luxuryhomesjohannesburg.com/real-estate-blog/serious-about-selling/#3) (Year: 2016).*

* cited by examiner

AUTOMATED VALUE DETERMINATION SYSTEM

BACKGROUND

Conventionally, determining a value for a home can be technically challenging because the value depends on a variety of factors (e.g., location, features of the home, comparable homes, etc.). In addition, determining a value for the home that is too high may cause the home to sit on the market for a longer period of time, while determining a value that is too low can result in lost profits. Certain existing systems have the ability to automate the home value determination, but ensuring that the automatically determined value is accurate remains a challenge.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
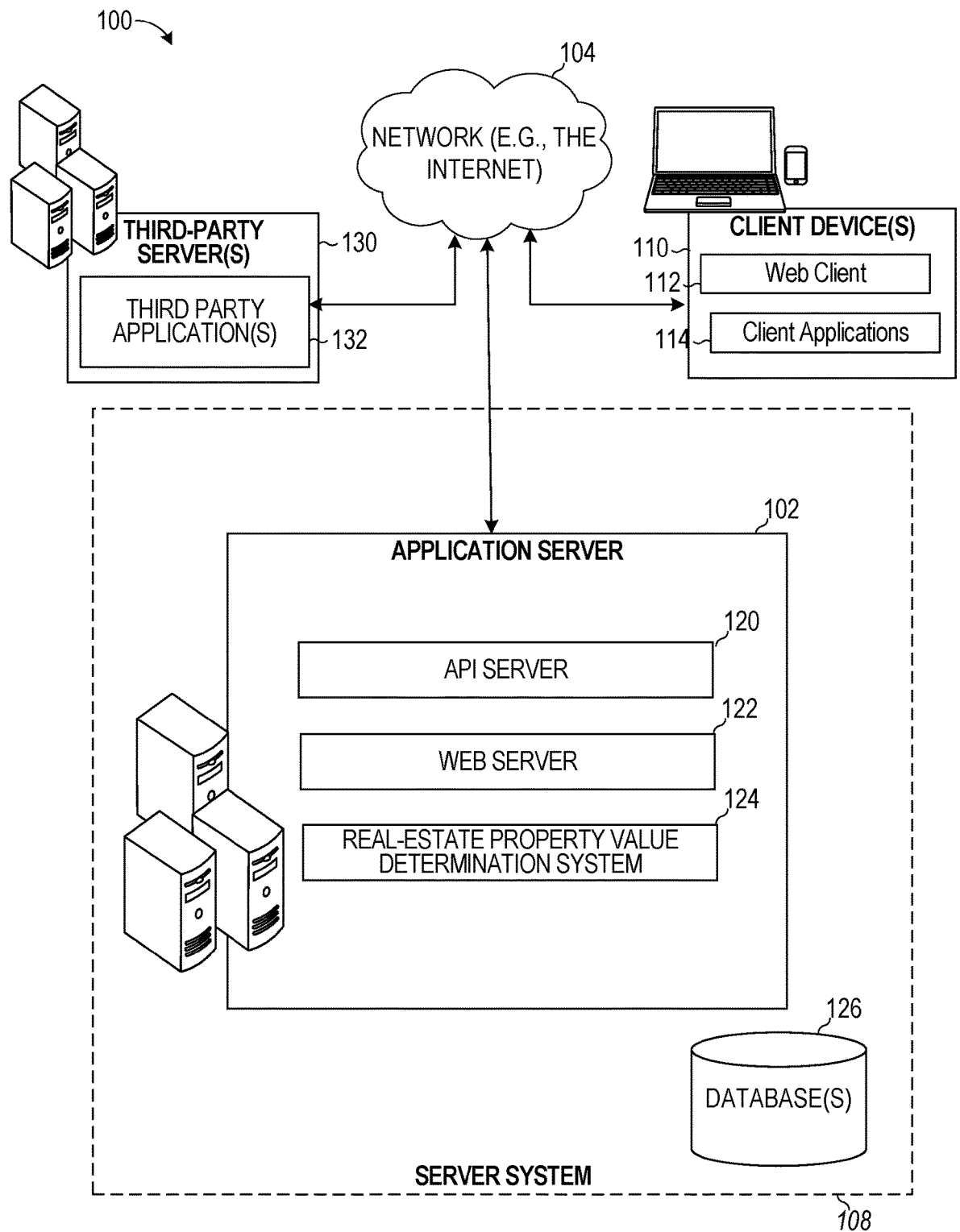
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Determining the right value for a given real-estate property is a key measure used by various entities (e.g., buyers, sellers, financial institutions, and other interested parties) to perform various real-estate transactions (e.g., a purchase and sale transaction, a mortgage transaction, etc.). For example, the value of the real-estate property can be used to obtain a mortgage for the property, refinance an existing mortgage on the property, list the property for sale, make an offer to purchase the property, or compute values of other nearby or similar properties. Various systems can automatically determine the value of a given real-estate property, referred to as the "subject" real-estate property, based on a sale price of other similar real-estate properties, referred to as "comps."

In some cases though, the models used by such systems to automatically determine the values of the subject properties generate inaccurate values. Providing inaccurate real-estate property values to an interested entity can have catastrophic consequences (e.g., lost profits, rejection of loans, generating poor quality mortgages, etc.).

The disclosed embodiments address these issues by ensuring that the automatically generated values for the subject property are accurate prior to having an interested entity rely on the automatically generated real-estate property value. Ideally, every automatically generated value would be reviewed by an operator before being made available to an interested entity, but having operators review all of the values is tedious, time consuming, and inefficient, and therefore slows down a potential real-estate transaction. Further, in the realm of the Internet, there may be hundreds or even thousands of real-estate property values being generated every second, making it impossible for the operator to review each and every one. This results in increased cost and missed opportunities. Accordingly, the disclosed embodiments improve the efficiency and accuracy of other systems that automatically determine real-estate property values and expedite providing the values to interested entities by reducing the times and number of automatically generated real-estate property values operators of the system review. Also, reducing operator involvement in the automatic value determination process reduces the overall error rate in the system as less values are manually reviewed and the operators are provided with more time to review certain other values. Specifically, the disclosed embodiments select only a limited subset of automatically determined values for review by an operator before providing the values to the interested entities. The subset selected for review by the operator corresponds to those cases that have been identified as potentially leading to inaccurately determined real-estate values (e.g., these values are flagged for review by the operator only under certain conditions). Specifically, according to some embodiments, an operator is prompted to review the automatically generated value for the real-estate property before the automatically generated value is provided to an interested entity if one or more conditions are met. These conditions correspond to conditions that have been previously identified as potentially resulting in inaccuracies in the models used for automatically determining real-estate property values.

One example condition relates to a situation in which the models rely on previously sold new construction real-estate properties (or those new construction real-estate properties that are listed for sale) in automatically determining the real-estate property value for the subject real-estate property. In such cases, the resulting automatically determined value may be skewed too high relative to its true market value. This is because buyers may be willing to pay more for a new construction type of property that has the same characteristics (e.g., same square footage, similar location, similar interior conditions, similar school district, similar amenities, similar tax rate, similar home owners association rate, etc.) as the subject real-estate property. This results in the model determining a higher value for the subject real-estate property (which may not be new construction) based on the fact that buyers previously paid a higher price than market price for the new construction real-estate properties or that a higher price than market price is listed for the new construction real-estate properties. To avoid such an inaccurate determination of value for the subject real-estate property, according to some embodiments, if a ratio of the aggregated weight of the new construction real-estate property sales relative to the total weight of the real-estate property sales used to automatically determine the subject real-estate property value exceeds a threshold, the operator is prompted to review the automatically determined value before the value is provided to an interested entity. If the ratio does not exceed the threshold, the automatically determined value is provided to the interested entity without operator review, which expedites the process and reduces the time an interested party spends waiting to receive a subject real-estate property value. As referred to herein, a sale price of a comp real-estate property represents the closing price (price at which the property sold), listing price (price which is being asked for by the seller), or pending price (price at which the property entered into contract and is pending closing).

Another example condition relates to a situation in which the models rely on a sale price of real-estate properties having different interior conditions than the subject real-estate property in automatically determining the real-estate property value for the subject real-estate property. In such cases, the resulting automatically determined value may be skewed too low relative to its true market value. This is because buyers may be willing to pay less than true market value for a property that has not been recently renovated (e.g., in that past 7 years). This results in the models determining a lower value for the subject real-estate property (e.g., which may have been recently renovated in the past year) based on the fact that the similar real-estate properties that have not been recently renovated have a lower sale price than the true market value. To avoid such an inaccurate determination of value for the subject real-estate property, according to some embodiments, if a value exceeds a threshold representing differences in the interior condition of the subject real-estate property relative to the overall interior conditions of the comp real-estate properties, the operator is prompted to review the automatically determined value before the value is provided to an interested entity. If the value does not exceed the threshold, the automatically determined value is provided to the interested entity without operator review, which expedites the process and reduces the time an interested party spends waiting to receive a real-estate property value.

FIG. 1 is a block diagram illustrating a networked system 100, according to some example embodiments, configured to determine a value of a subject real-estate property and provide the value to an interested entity. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize home buying services. For example, the client device 110 may be used to input information to request an offer on a subject real-estate property, to request a value of a subject real-estate property, to make an offer on a subject real-estate property, to receive and display various information about a subject real-estate property or a market, and so forth.

For example, client device 110 is a device of a given user who would like to sell his or her subject real-estate property. Client device 110 accesses a website of the home buying and selling service (e.g., hosted by server system 108). The user inputs an address of the subject real-estate property and selects an option to receive an offer or value of the subject real-estate property in the website. Server system 108 receives the request and identifies comps (e.g., a plurality of real-estate properties) having similar attributes as the subject real-estate property. Server system 108 automatically retrieves characteristics of the subject real-estate property based on the address and search for comps within a predetermined distance (e.g., 1.2 miles) of the address of the subject real-estate property. Server system 108 then automatically computes a value for the subject real-estate property and provides the value to the client device 110 instantly or after a period of time (e.g., 24 hours). In some circumstances, server system 108 involves an operator of the website of the home buying and selling service using an operator device to review the value that was automatically computed before the value is returned to the client device 110. Client device 110 receives the value and provides an option to the user to complete the real-estate transaction. For example, the user selects an option to complete the sale of the real-estate property. In response, server system 108 automatically generates a contract for sale of the subject real-estate property and allows the user to execute the contract to complete the sale. After the user executes the contract, the subject real-estate property enters a pending status. Server system 108 may present a list of available closing dates to the user. Once the user selects the closing date, the subject real-estate property closes at the contract price on the closing date.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 114 are included in a given one of the client device 110, and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., access location information, access market information related to homes, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or wide area network (WAN)) to one or more third-party servers 130 and/or one or more client devices 110. The server system 108 includes an application program interface (API) server 120, a web server 122, and a real-estate property value determination system 124, that may be communicatively coupled with one or more databases 126. The one or more databases 126 may be storage devices that store data related to users of the system 108, applications associated with the system, cloud services, housing market data, and so forth. The one or more databases 126 may further store information related to third-party servers 130, third-party applications 132, client devices 110, client applications 114, users, and so forth. In one example, the one or more databases 126 may be cloud-based storage.

The server system 108 may be a cloud computing environment, according to some example embodiments. The server system 108, and any servers associated with the server system 108, may be associated with a cloud-based application, in one example embodiment.

The server system 108 includes a real-estate property value determination system 124. Real-estate property value determination system 124 may include one or more servers and may be associated with a cloud-based application. Real-estate property value determination system 124 may obtain real-estate property information representing activity information associated with a plurality of real-estate properties from databases 126. Real-estate property value determination system 124 determines a value of a subject real-estate property input by a user of client device 110 and returns the value to the client device 110. The user of client device 110 may be an interested entity that desires to complete a real-estate transaction associated with the subject real-estate property. In some implementations, real-estate property value determination system 124 automatically determines the value of the subject real-estate property and returns the value to the client device 110 without further operator involvement. In other circumstances, when a certain condition or conditions are met, the automatically computed value of the subject real-estate property is flagged for review by prompting an operator to review the determined value before being provided to the client device 110 for presentation to the interested entity. The details of real-estate property value determination system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include a multiple listing service (MLS) server. This service is publicly accessible to real-estate brokers nationwide. A real-estate broker inputs property information to the MLS server (e.g., price information and property attributes) to list the property for sale. Other brokers can access the MLS server to search and filter properties available for sale or that have been sold and select a given property to view. The MLS server may allow a real-estate broker to provide an offer to purchase a given property being listed for sale on behalf of a buyer. The MLS server may indicate whether a given property listing is pending indicating that an executed purchase and sale agreement between a buyer and seller of the real-estate property has been received. Typically, the real-estate property closes or sells about 70 days following the receipt of the signed agreement to purchase the real-estate property.

The MLS server may include a database of real-estate properties. Characteristics of each property stored in the MLS server may also be provided. Characteristics include a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. The information of the MLS server may be included as part of database 126. The MLS real-estate properties information may be used to search for comps to automatically determine a value of a subject real-estate property.

Figure 2:
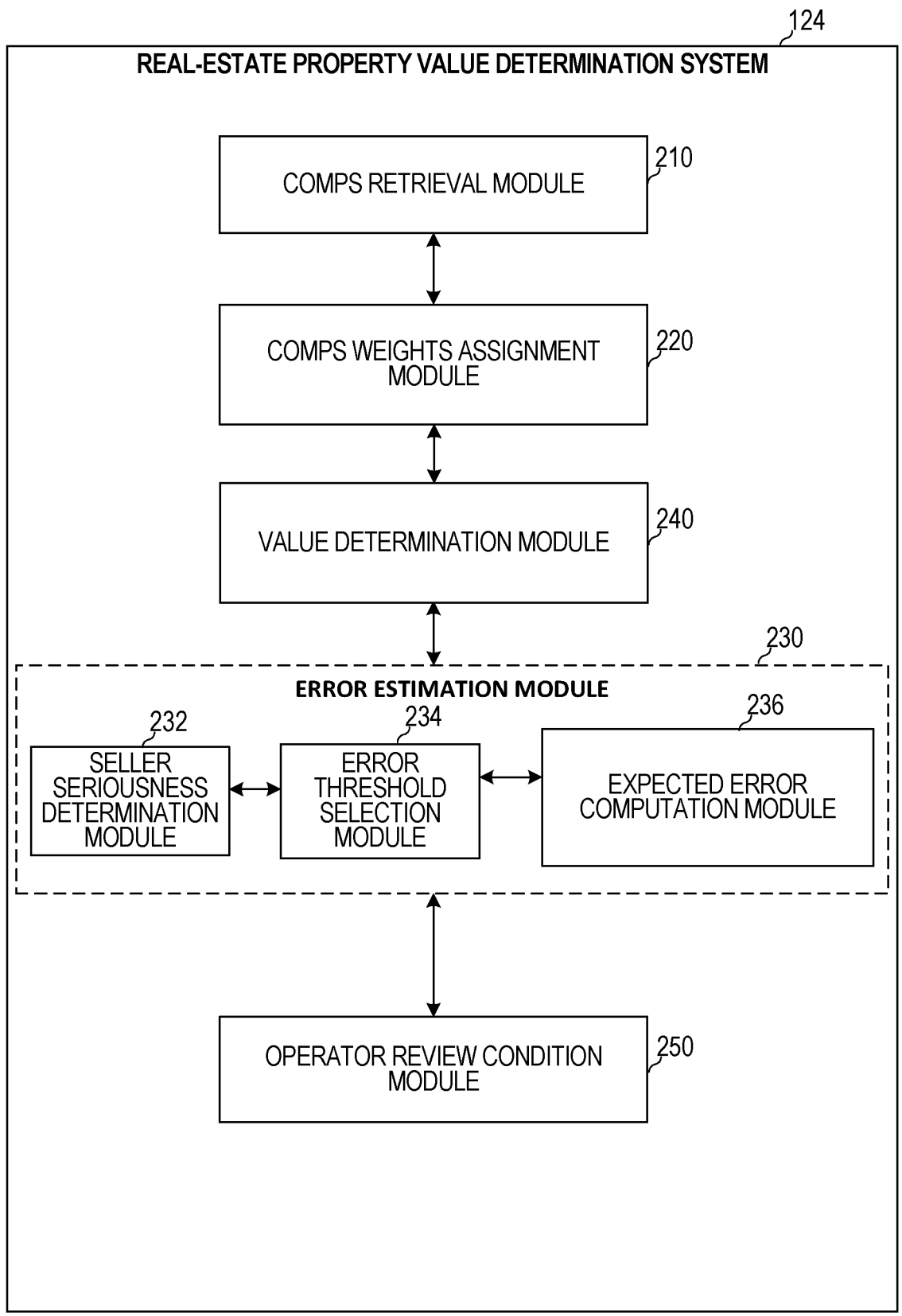
FIG. 2 illustrates a real-estate property value determination system, according to some example embodiments.
Figure 3:
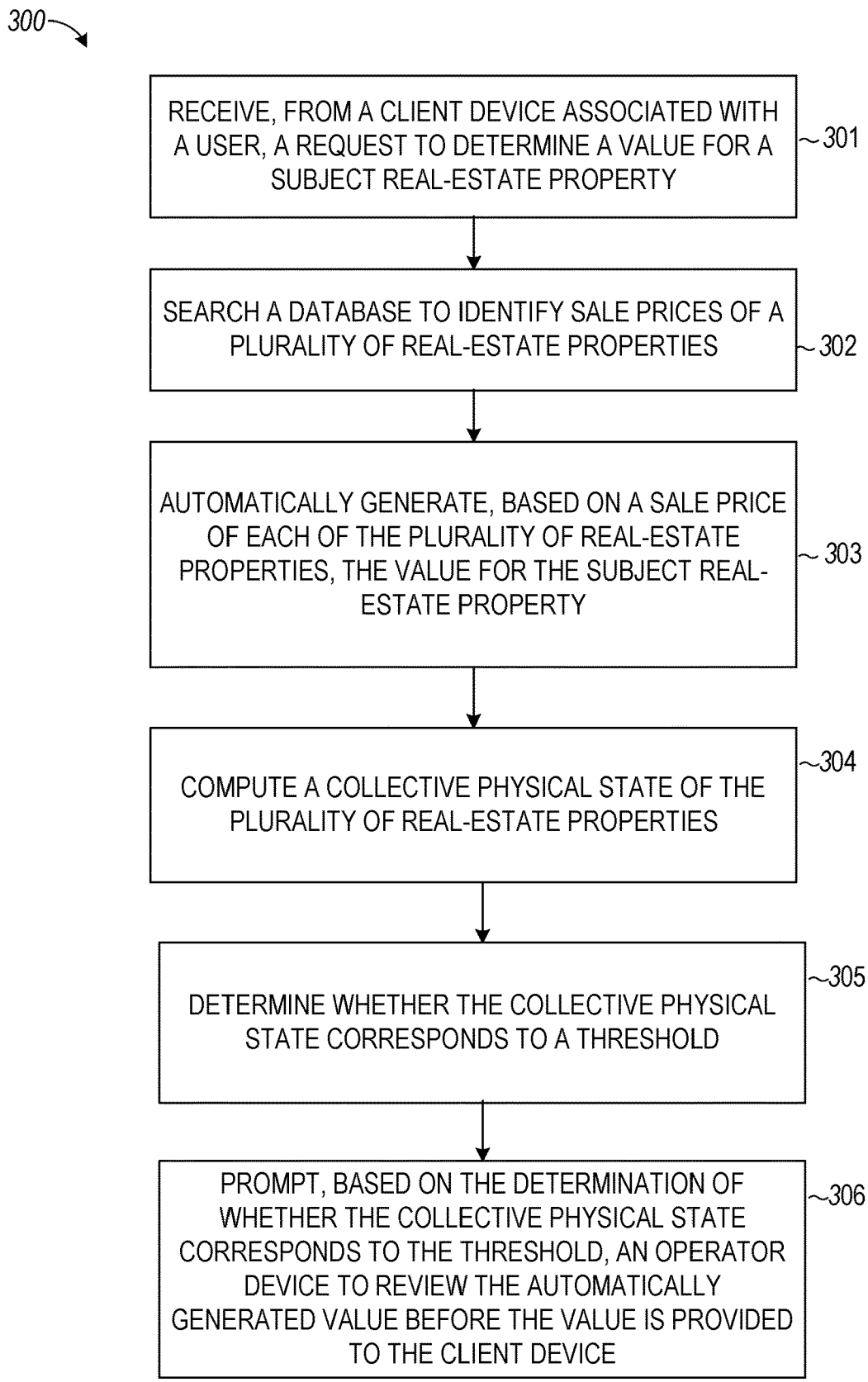
FIGS. 3-6 illustrate flow diagrams of processes for determining whether to prompt an operator to review an automated real-estate property value, according to some example embodiments.

FIG. 2 illustrates a real-estate property value determination system 124, according to some example embodiments. Real-estate property value determination system 124 includes a comps retrieval module 210, a comps weights assignment module 220, a value determination module 240, an error estimation module 230, and an operator review condition module 250.

Comps retrieval module 210 receives an input address of a subject real-estate property from a client device 110 and identifies one or more real-estate property comps. Comps retrieval module 210 may search for any real-estate property that is within a given distance (e.g., 1.2 miles) of the address of the subject real-estate property. The search may be performed on the MLS server by accessing database 126. Comps retrieval module 210 may limit the search on the MLS server based on one or more parameters. The parameters may include status of the comps (e.g., closed, active, or pending), sale time interval (e.g., within the past 2 years), and sale price range (e.g., within $50k of the average sale price of real-estate properties in the 1.2 mile radius). In this way, comps retrieval module 210 may identify all of the real-estate properties that are active, closed, or pending, that are within 1.2 miles of the subject real-estate property, that have had activity within the past two years, and are within a certain sale price range.

After these real-estate properties have been identified in the MLS server as matching the parameters, the comps retrieval module 210 may rank the number of comps based on similarity to the subject real-estate property. For example, comps retrieval module 210 may access database 126 (or request further input from client device 110) to retrieve one or more characteristics of the subject real-estate property. Specifically, the comps retrieval module 210 may determine a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. Comps retrieval module 210 may also retrieve the same corresponding characteristics of the real-estate properties have been identified in the MLS server as matching the parameters. Comps retrieval module 210 may rank the real-estate properties have been identified in the MLS server as matching the parameters based on how many of the characteristics of the real-estate properties have been identified in the MLS server as matching the parameters match the characteristics of the subject real-estate property. In certain embodiments, comps retrieval module 210 may select the top twenty real-estate properties in the ranked list as the identified real-estate properties for use in determining a value of the subject real-estate property.

In some embodiments, comps retrieval module 210 determines that the number of identified real-estate properties retrieved from the MLS or in the ranked list is less than a predetermined number (e.g., less than three). In such circumstances, comps retrieval module 210 may instruct operator review condition module 250 to prompt an operator to manually generate a value for the subject real-estate property using an operator device. Alternatively, value determination module 240 may automatically determine a value for the subject real-estate property even though less than the predetermined number of comps is available. In such circumstances, comps retrieval module 210 may instruct operator review condition module 250 to prompt an operator to review a value automatically determined for the subject real-estate property by value determination module 240.

After generating the ranked list of comps, comps retrieval module 210 adjusts a sale price of each comp in the ranked list. Specifically, comps retrieval module 210 adjusts a sale price of each comp to reflect a price of the comp were the characteristics of the comp more similar to the characteristics of the subject real-estate property. For example, if the subject real-estate property has a pool and a comp does not, sale price of the comp is increased. Similarly, if the subject real-estate property has not been renovated and a comp has been renovated, the sale price of the comp is decreased. The output of the comps retrieval module 210 is a ranked list of a predetermined number (e.g., twenty) real-estate property sales that have their sale prices adjusted based on characteristics of the subject real-estate property. This output is provided to the comps weights assignment module 220.

The comps weights assignment module 220 may assign different weights to each adjusted sale price provided by comps retrieval module 210. For example, comps weights assignment module 220 assigns weights to each adjusted sale price based on one or more characteristics of the corresponding comp real-estate property. Specifically, if the subject real-estate property has a pool, a higher weight may be assigned to an adjusted sale price corresponding to a comp that has a pool than an adjusted sale price corresponding to a comp that does not have a pool. In some implementations, higher weight values may be assigned to adjusted sale prices of comps that are more similar (e.g., are ranked higher in the list) to the subject real-estate property.

The weighted adjusted sale prices are output from comps weights assignment module 220 to value determination module 240. Value determination module 240 may include a model for automatically determining subject real-estate values. In some implementations, value determination module 240 computes a weighted average of the weighted adjusted sale prices. The weighted average may be provided as the determined value of the subject real-estate property. In some embodiments, this automatically determined value is returned to the client device 110 as the value of the subject real-estate transaction without further operator review or involvement. In some embodiments, a set of conditions are determined and tested to determine whether operator review is needed for the automatically determined value before the value is returned to the interested entity or user of the client device 110. Such conditions are discussed in connection with FIGS. 3-6 below and are performed by operator review condition module 250.

Specifically, whether the automated value is provided to the interested entity or user of the client device 110 is determined by at least one of whether the expected error (computed by error estimation module 230 based on seriousness of the user or interested entity of client device 110) on the subject real-estate property is below a certain threshold or whether the subject real-estate property value determination passes a series of other hard filters or conditions (e.g., whether a ratio of the weights of the comps being new construction to the total number of weights exceeds a threshold, whether a minimum number of comps were found, and/or whether sufficient similarity of interior conditions of the comps exists with the interior condition of the subject real-estate property). Operator review condition module 250 may determine whether any of these filters or expected errors are met (e.g., exceed a threshold) and in response may prevent the automatically determined value from being returned to client device 110 without first being reviewed by an operator of the server system 108. In some embodiments, operator review condition module 250 prompts the operator to review the automatically determined value of the subject real-estate property by presenting a set of options in a graphical user interface 700 (FIG. 7) discussed below. After the operator reviews the automatically determined value via user interface 700, the reviewed value is returned to the user or interested entity of client device 110.

Error estimation module 230 includes a seller seriousness determination module 232, an error threshold selection module 234, and an expected error computation module 236. Expected error computation module 236 implements a model that determines an estimate of the error in the automatically determined value of the subject real-estate property. Specifically, some real-estate properties are more difficult to value than others, and so such properties are assigned a higher expected error by expected error computation module 236. This ensures that if a property is inherently difficult to value, the automatically determined value is reviewed by an operator (e.g., a system moderator or human operator of server system 108). In some implementations, the model implemented by error computation module 236 may be an artificial neural network or any other machine learning model. The model may fit a linear regression with real-estate property characteristics (e.g., square feet, age) as predictors and realized error as the target. The model may receive the characteristics of the subject real-estate property and may compute or determine an expected error. The expected error represents an error between the automatically determined real-estate property value and its likely true value. The model may be trained to generate this expected error by automatically computing sale prices for a number of real-estate properties that have previously been sold and comparing the automatically computed sale price to the actual sale price to determine the error. The error may be computed based on the following function: error percentage=100*|(automatically computed value)−(actual sale value)/(actual sale value)|.

Seller seriousness determination module 232 determines a level of seriousness of the entity or user of client device 110 in completing the real-estate transaction (e.g., in selling the subject real-estate property). In some embodiments, the user of client device 110 is presented with a list of options to allow the user to input their level of seriousness. In some embodiments, the level of seriousness is determined automatically based on a user profile of the user of the client device 110. For example, seller seriousness determination module 232 determines how much detail the user of client device 110 provided about the subject real-estate property (e.g., how many characteristics the user provided about the property and how many pictures the user of the client device 110 provided). In some implementations, seller seriousness determination module 232 determines that the user of client device 110 is very serious about completing the transaction (e.g., assign the maximum level of seriousness value to the user) if the user provided pictures of the subject real-estate property. In some implementations, seller seriousness determination module 232 determines that the user of client device 110 is not serious about completing the transaction (e.g., assign the lowest level of seriousness value to the user) if the user does not provide pictures of the subject real-estate property.

Seller seriousness determination module 232 outputs to error threshold selection module 234 the determined level of seriousness of the user or entity of the client device 110. The error threshold selection module 234 selects between two or more error thresholds based on the determined level of seriousness of the user or entity of the client device 110. In some implementations, a lower error threshold value is selected in response to determining that the level of seriousness is a high value (e.g., is valued at 3 from a range of 1-3 indicating the user is very interested in completing the transaction) and a higher error threshold value is selected in response to determining that the level of seriousness is a low value (e.g., is valued at 1 from a range of 1-3 indicating the user is not very interested in completing the transaction). Operator review condition module 250 compares the selected error threshold from error threshold selection module 234 to the expected error output by expected error computation module 236. If the expected error output by expected error computation module 236 exceeds the selected error threshold, operator review condition module 250 prompts the operator to review the automatically determined value. In this way, if the entity or user of client device 110 is very interested in completing the transaction, a lower error threshold is selected which increases the likelihood that the operator will review the automatically determined value. This reduces the risk that a poor or inaccurate value is presented to the interested entity of client device 110 and profits are lost.

FIGS. 3-6 illustrate flow diagrams of processes 300-600 for determining whether to prompt an operator to review an automated real-estate property value, according to some example embodiments. The processes 300-600 may be embodied in computer-readable instructions for execution by one or more processors such that the operations of the processes 300-600 may be performed in part or in whole by the functional components of the server system 108; accordingly, the processes 300-600 are described below by way of example with reference thereto. However, in other embodiments at least some of the operations of the processes 300-600 may be deployed on various other hardware configurations. The processes 300-600 are therefore not intended to be limited to the server system 108 and can be implemented in whole, or in part, by any other component.

At operation 301, a computing system (e.g., server system 108) receives a request from a client device 110 associated with a user to determine a value for a subject real-estate property. For example, real-estate property value determination system 124 receives from the client device 110 a request to determine a value for a subject real-estate property. In one example, the request includes an address and characteristics of the subject real-estate property to real-estate property value determination system 124.

At operation 302, the computing system searches a database to identify sale prices of a plurality of real-estate properties. For example, comps retrieval module 210 searches database 126 or MLS server for nearby real-estate properties. The property search is limited to properties within a certain distance (e.g., 1.2 miles) of the subject real-estate property and that have certain characteristics that make them similar to the subject real-estate property.

At operation 303, the computing system automatically generates the value for the subject real-estate property based on a sale price of each of the plurality of real-estate properties. For example, value determination module 240 computes a weighted average of the sale prices of the identified real-estate properties. In some implementations, this may be performed after ranking, weighting, and adjusting the sale prices of the properties.

At operation 304, the computing system computes a collective physical state of the plurality of real-estate properties. In one example, process 400 (FIG. 4) is executed to compute the collective physical state based on whether the comps include new construction properties. In another example, process 500 (FIG. 5) is executed to compute the collective physical state based on differences in interior conditions of the comps and the subject real-estate property. In yet another example, process 400 and process 500 are both executed, serially or in parallel, to compute the collective physical state. In such circumstances, the collective physical state is a vector of different physical states and any value from the vector can be retrieved and compared with a threshold at operation 305 to determine whether the value corresponds to the threshold.

Figure 4:
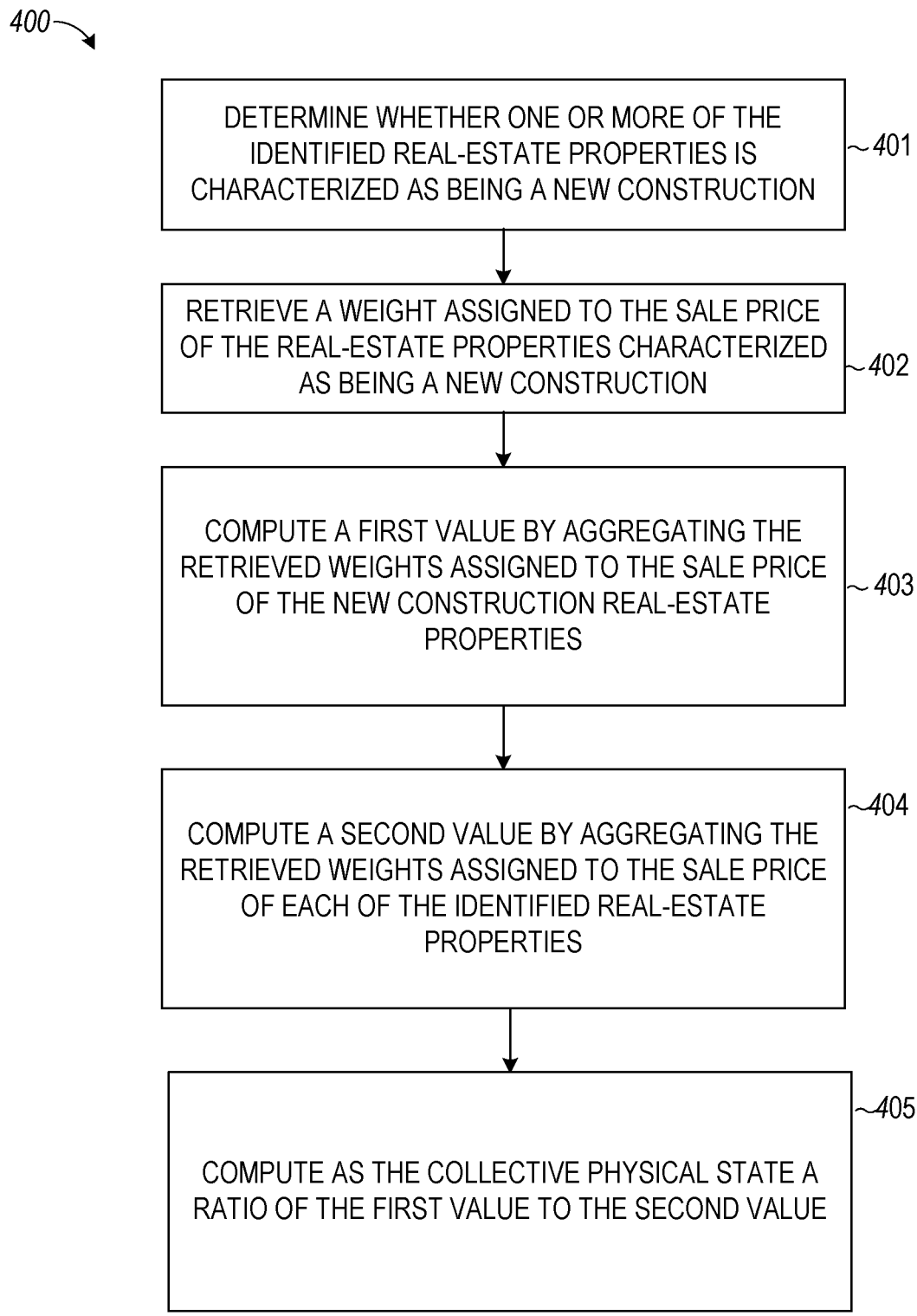

At operation 401 of FIG. 4, the computing system determines whether one or more of the identified real-estate properties is characterized as being a new construction. For example, comp weights assignment module 220 identifies which of the comps received from comps retrieval module 210 corresponds to a new construction (e.g., has been built in the past two years or has never been physically occupied).

At operation 402, the computing system assigns a weight to the sale price of the real-estate properties characterized as being a new construction. For example, the comps weights assignment module 220 retrieves the weight it assigned to each of the sale prices of the new construction comps.

At operation 403, the computing system computes a first value by aggregating the retrieved weights assigned to the sale price of the new construction real-estate properties. For example, comps weights assignment module 220 computes an overall weight value for each of the comps that corresponds to a new construction by aggregating (e.g., summing) the weights assigned to each of the comps' corresponding adjusted sale price.

At operation 404, the computing system computes a second value by aggregating the retrieved weights assigned to the sale price of each of the identified real-estate properties. For example, the comps weights assignment module 220 aggregates (e.g., sums) the total weights of the comps determined by comps weights assignment module 220 of the properties provided by comps retrieval module 210.

At operation 405, the computing system computes a collective physical state as a ratio of the first value to the second value. For example, the computing system computes a ratio of the aggregated weights of the new construction comps to the total weights of the comps determined by the comps weights assignment module 220. This ratio represents the collective physical state (e.g., new construction state) of the comps.

Figure 5:
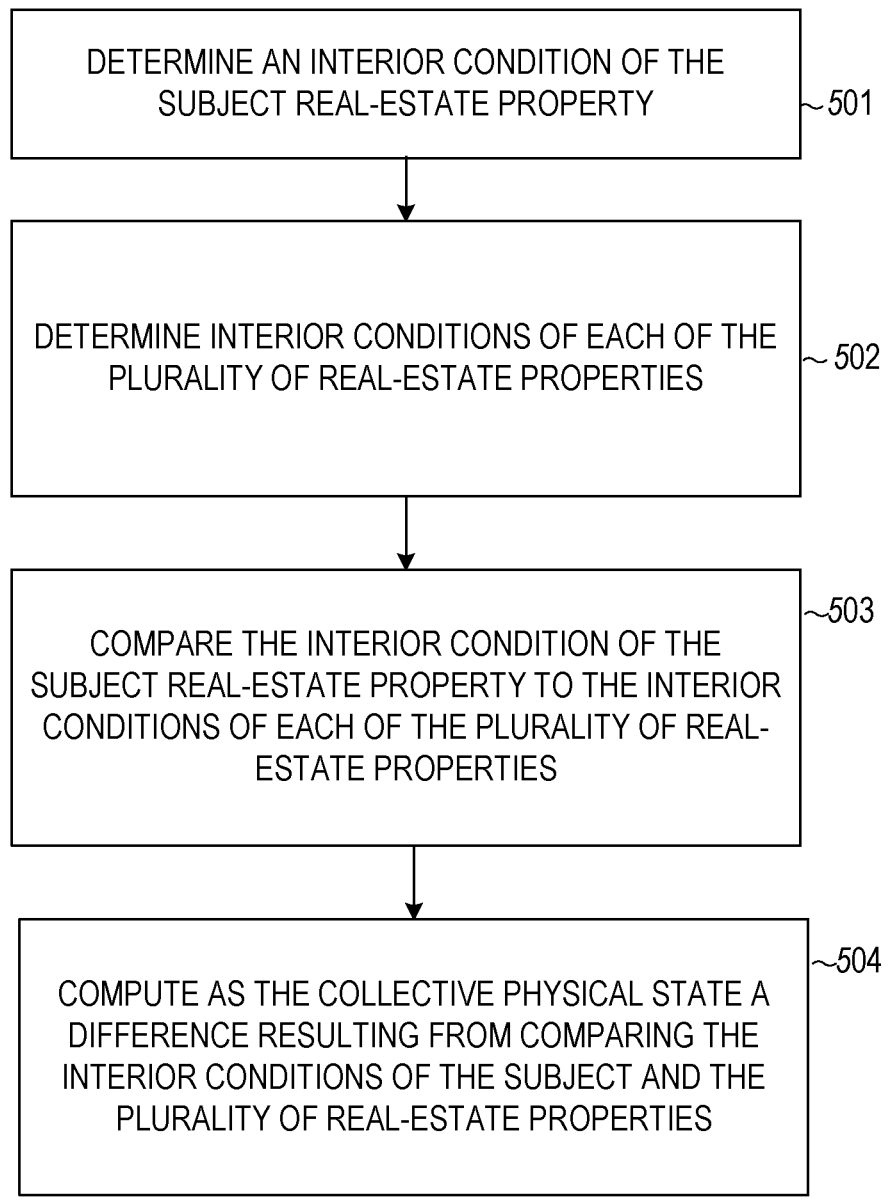
Figure 6:
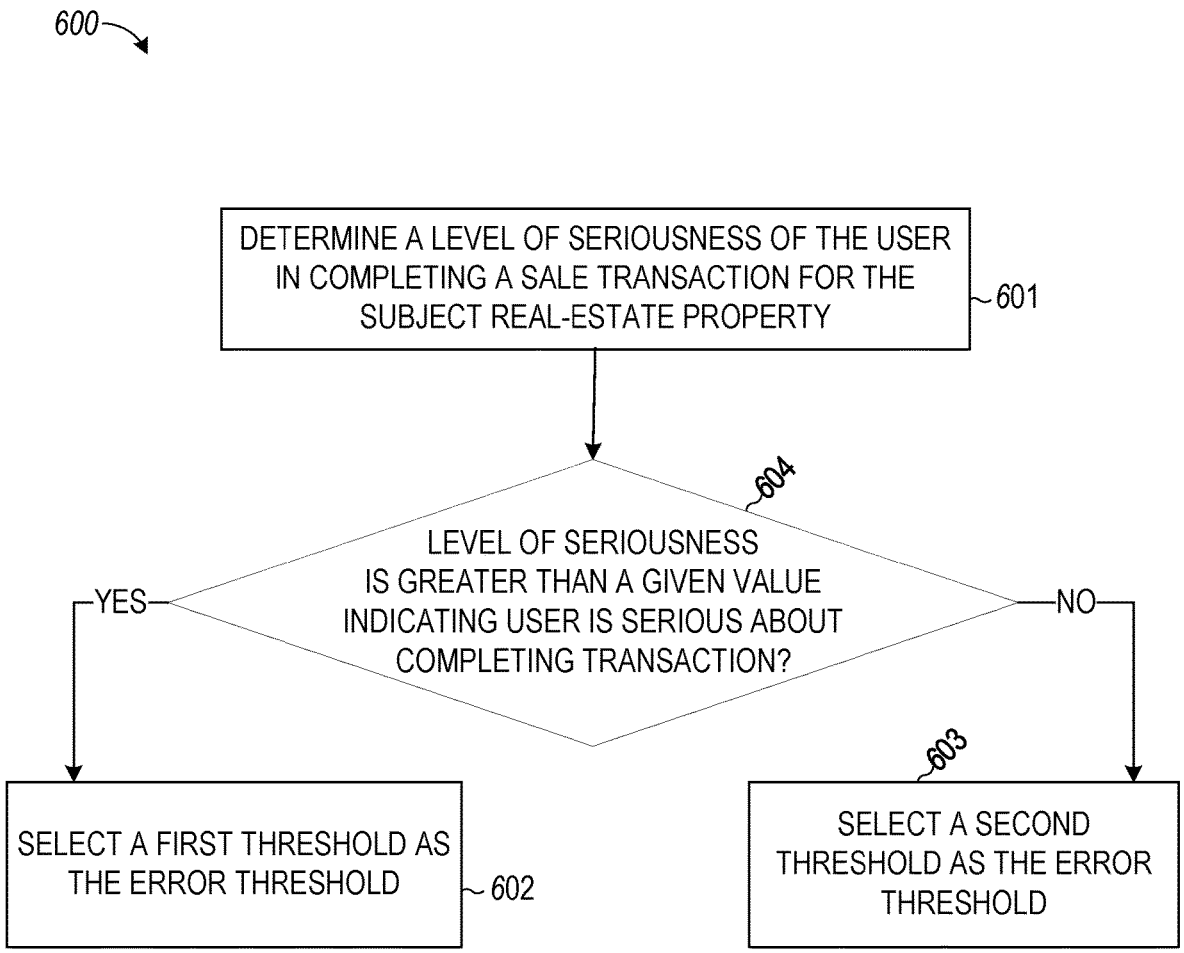

At operation 501 of FIG. 5, the computing system determines an interior condition of the subject real-estate property. For example, comps retrieval module 210 requests the user of client device 110 provide details about the interior condition of the subject real-estate property. Alternatively or in addition, comps retrieval module 210 accesses the MLS database to retrieve interior conditions previously provided about the subject real-estate property.

At operation 502, the computing system determines interior conditions of each of the plurality of real-estate properties. For example, comps retrieval module 210 accesses the MLS database to retrieve interior conditions of the comps.

At operation 503, the computing system compares the interior condition of the subject real-estate property to the interior condition of each of the plurality of real-estate properties. For example, comps retrieval module 210 aggregates into a value a representation of the differences between the interior conditions, indicating how different the interior conditions of the comps are relative to the interior condition of the subject real-estate property.

At operation 504, the computing system computes a collective physical state as a difference resulting from comparing the interior conditions of the subject and the plurality of real-estate properties. For example, comps retrieval module 210 outputs an aggregated value representing the collective physical state of the comps based on the different in interior conditions (e.g., the interior condition of each comp relative to that of the subject real-estate property).

Referring back to FIG. 3, at operation 305, the computing system determines whether the collective physical state corresponds to a threshold. For example, the operator review condition module 250 compares the ratio representing, e.g., the aggregated weights of the new construction comps, the difference in interior conditions, or a combination of the aggregated weights of the new construction comps and the difference in interior conditions, to a given threshold (e.g., 20 percent or some other suitable value).

At operation 306, the computing system causes an operator to be prompted by an operator device based on the determination of whether the collective physical state corresponds to the threshold to review the automatically generated value before the value is presented to the user. For example, operator review condition module 250 presents a graphical user interface 700 (FIG. 7) with options allowing an operator to review the automatically determined value of the subject real-estate property before the value is provided to the interested entity or user of client device 110.

In some embodiments, an operator is prompted to review an automatically determined value for a subject real-estate property if an expected error exceeds a threshold. The threshold error may be selected based on a level of seriousness of the interested entity in completing the real-estate transaction using the process 600 of FIG. 6. At operation 601, the computing system determines a level of seriousness of the user in completing a sale transaction for the subject real-estate property. For example, seller seriousness determination module 232 requests input from the user of client device 110 specifying the level of seriousness of the user in completing a real-estate transaction (e.g., between 1-3, 3 being very interested). In some implementations, seller seriousness determination module 232 automatically determines the level of seriousness based on the amount of information the user of client device 110 provides about the subject real-estate property (e.g., whether the user provides pictures of the property).

At operation 604, the computing system determines whether the level of seriousness of the user in completing the transaction is greater than a given value indicating the user is serious about completing the transaction. In response to determining that the level of seriousness of the user is greater than the given value, the process 600 proceeds to operation 602; otherwise the process 600 proceeds to operation 603. For example, the computing system retrieves the automatically determined or user provided level of seriousness ranging from values 1-3 and compares the level to a given value (e.g., a number within the seriousness level range such as two).

At operation 602, the computing system selects a first threshold as the error threshold in response to determining that the level of seriousness is greater than a given value indicating that the user is serious about completing the sale transaction. For example, error threshold selection module 234 selects a first threshold having a lower value than a second threshold if the level of seriousness determined by module 232 is greater than the given value (e.g., if the level of seriousness is 3 and the given value is 2).

At operation 603, the computing system selects a second threshold as the error threshold in response to determining that the level of seriousness is less than or equal to the given value. For example, error threshold selection module 234 selects a second threshold having a higher value than the first threshold if the level of seriousness determined by module 232 is less than or equal to the given value (e.g., if the level of seriousness is 1 and the given value is 2).

Figure 7:
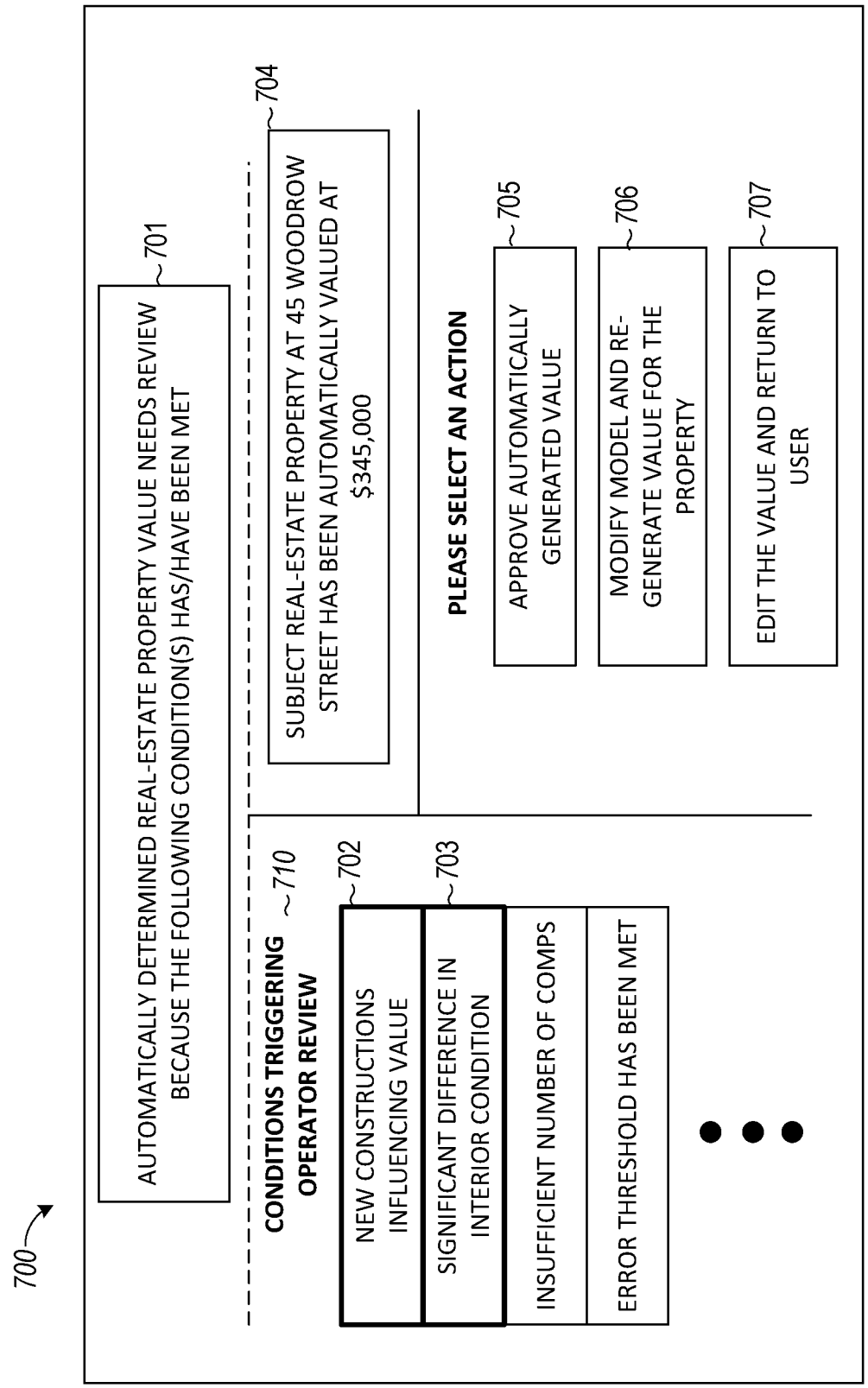
FIG. 7 is an illustrative user interface for prompting an operator to review an automated real-estate property value, according to some example embodiments.

FIG. 7 is an illustrative user interface 700 for prompting an operator to review an automated real-estate property value, according to some example embodiments. User interface 700 is presented on an operator device and includes a message 701 informing an operator that an automatically determined value for a subject real-estate property needs to be reviewed. User interface 700 includes a message 704 that identifies the subject real-estate property and includes the automatically determined value for the subject real-estate property. Message 704 may list the characteristics, photographs, and address of the subject real-estate property.

User interface 700 includes a section 710 that lists a set of one or more conditions that have to be met for the operator to review automatically determined values. In some circumstances, the conditions 702 and 703 that resulted in the prompt being provided to the operator are visually distinguished (e.g., highlighted or marked with a bold border) from conditions that have not been satisfied. In the example shown, the condition 702 represents a condition in which a ratio of the weights of new construction comps to the total weights of the comps used to determine the value of the subject real-estate property exceeded a threshold. Condition 703 represents a condition in which a value representing differences in interior conditions of the subject real-estate property relative to the interior conditions of the comps exceeded a threshold.

In some embodiments, conditions listed in section 710 are interactive. In response to receiving an input from the operator selecting one of the conditions listed in section 710, code segments of the model or a list of corresponding comps is presented to the operator associated with the selected condition. The operator can mark certain sale prices of comps for exclusion or revision to have the value of the subject real-estate property be re-determined by module 240. For example, if the operator selects condition 702, a list of all the new construction comps is presented to the operator and the operator can select to exclude some or all of the new construction comps from the value determination of the subject real-estate property.

User interface 700 includes a set of options 705, 706 and 707 allowing the operator to take action in response to receiving the prompt to review the automatically determined value of the subject real-estate property. In response to receiving a selection from the operator of the option to approve automatically generated value 705, the automatically determined value of the subject real-estate property is provided without modification to the client device 110 associated with the interested entity or user. In response to receiving a selection from the operator of the option to modify model and re-generate value for the property 706, the model used to generate the value is presented to the operator. The operator can then modify attributes of the model (e.g., expand the search area from 1.2 miles to 3 miles) and have the model re-run using the same or different comps to automatically determine the value for the subject real-estate property. The newly determined value is either returned to the entity or user of client device 110 or prompted for further review if certain conditions are met again. In response to receiving a selection from the operator of the option to edit the value and return to user 707, the operator may enter a manually computed value for the subject real-estate property and have that manually computed value returned to the client device 110 associated with the entity or user.

Figure 8:
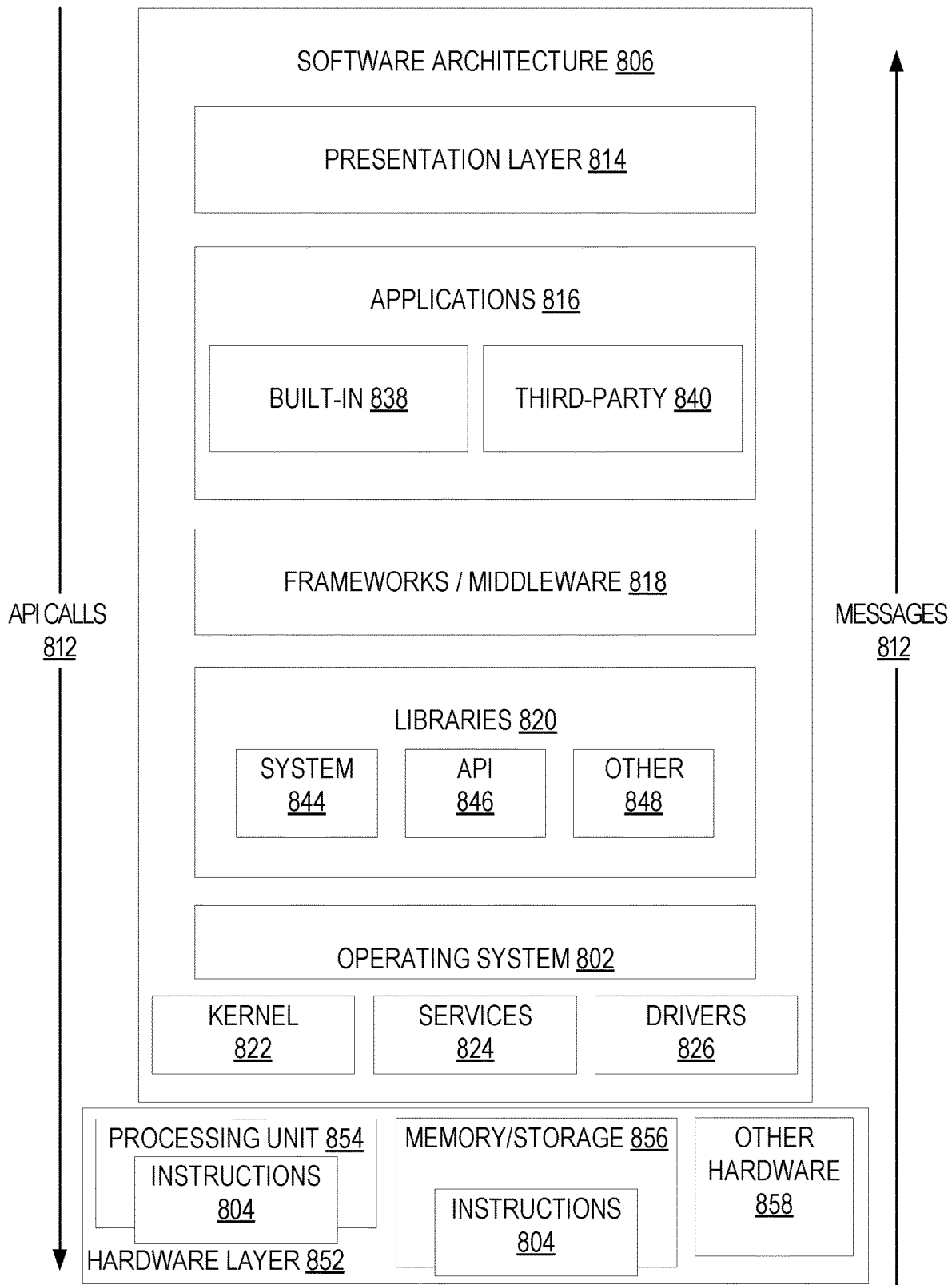
FIG. 8 is a block diagram illustrating an example of a software architecture that may be installed on a machine, according to some example embodiments.

FIG. 8 is a block diagram illustrating software architecture 806, which can be installed on any one or more of the devices described above. For example, in various embodiments, client devices 110 and servers and systems 130, 102, 108, 120, 122, and 124 may be implemented using some or all of the elements of software architecture 806. FIG. 8 is merely a non-limiting example of a software architecture, and it will be appreciated that many other architectures can be implemented to facilitate the functionality described herein. In various embodiments, the software architecture 806 is implemented by hardware such as machine 900 of FIG. 9 that includes processors 904, memory/storage 906, and I/O components 918. In this example, the software architecture 806 can be conceptualized as a stack of layers where each layer may provide a particular functionality. For example, the software architecture 806 includes layers such as an operating system 802, a presentation layer 814, libraries 820, frameworks 818, hardware layer 852 (which includes a processing unit 854 that executes instructions 804, a memory/storage 856 that stores instructions 804, and other hardware 858), and applications 816. Operationally, the applications 816 invoke application programming interface (API) calls 808 through the software stack and receive messages 812 in response to the API calls 808, consistent with some embodiments.

In various implementations, the operating system 802 manages hardware resources and provides common services. The operating system 802 includes, for example, a kernel 822, services 824, and drivers 826. The kernel 822 acts as an abstraction layer between the hardware and the other software layers, consistent with some embodiments. For example, the kernel 822 provides memory management, processor management (e.g., scheduling), component management, networking, and security settings, among other functionality. The services 824 can provide other common services for the other software layers. The drivers 826 are responsible for controlling or interfacing with the underlying hardware, according to some embodiments. For instance, the drivers 826 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 820 provide a low-level common infrastructure utilized by the applications 816. The libraries 820 can include system libraries 844 (e.g., C standard library) that can provide functions such as memory allocation functions, string manipulation functions, mathematic functions, and the like. In addition, the libraries 820 can include API libraries 846 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 820 can also include a wide variety of other libraries 848 to provide many other APIs to the applications 816.

The frameworks 818 provide a high-level common infrastructure that can be utilized by the applications 816, according to some embodiments. For example, the frameworks 818 provide various graphic user interface (GUI) functions, high-level resource management, high-level location services, and so forth. The frameworks 818 can provide a broad spectrum of other APIs that can be utilized by the applications 816, some of which may be specific to a particular operating system 802 or platform.

In an example embodiment, the applications 816 include a home application, a contacts application, a browser application, a book reader application, a location application, a media application, a messaging application, a game application, and a broad assortment of other applications such as a third-party application 840 or built-in applications 838. According to some embodiments, the applications 816 are programs that execute functions defined in the programs. Various programming languages can be employed to create one or more of the applications 816, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 808 provided by the operating system 802 to facilitate functionality described herein.

Some embodiments may particularly include a real estate application. In certain embodiments, this may be a stand-alone application that operates to manage communications with a server system such as third-party servers 130 or server system 108. In other embodiments, this functionality may be integrated with another application. The real estate application may request and display various data related to real estate and may provide the capability for a user to input data related to the objects via a touch interface, keyboard, or using a camera device of machine 900, communication with a server system via I/O components 918, and receipt and storage of object data in memory/storage 906. Presentation of information and user inputs associated with the information may be managed by the real estate application using different frameworks 818, library 820 elements, or operating system 802 elements operating on a machine 900.

Figure 9:
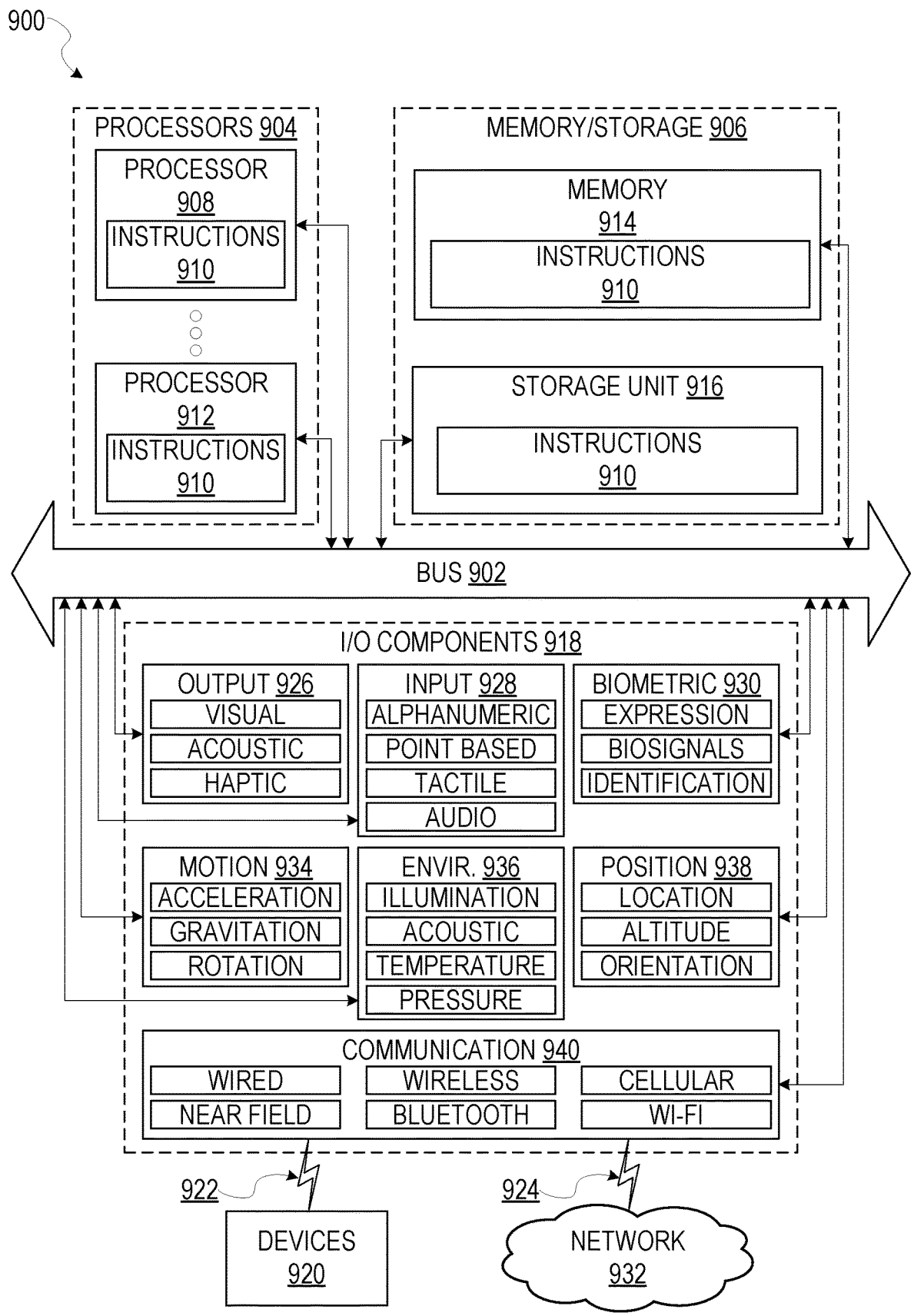
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application 816, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 108, 120, 122, 124, etc., or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines 900 that individually or jointly execute the instructions 910 to perform any one or more of the methodologies discussed herein.

In various embodiments, the machine 900 comprises processors 904, memory 914, and I/O components 918, which can be configured to communicate with each other via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 908 and a processor 912 that may execute the instructions 910. The term "processor" is intended to include multi-core processors 904 that may comprise two or more independent processors 904 (also referred to as "cores") that can execute instructions 910 contemporaneously. Although FIG. 9 shows multiple processors 904, the machine 900 may include a single processor 904 with a single core, a single processor 904 with multiple cores (e.g., a multi-core processor 904), multiple processors 904 with a single core, multiple processors 904 with multiples cores, or any combination thereof.

The memory/storage 906 comprises a main memory 914, a static memory, and a storage unit 916 accessible to the processors 904 via the bus 902, according to some embodiments. The storage unit 916 can include a machine-readable medium on which are stored the instructions 910 embodying any one or more of the methodologies or functions described herein. The instructions 910 can also reside, completely or at least partially, within the main memory 914, within the static memory, within at least one of the processors 904 (e.g., within the processor's cache memory), or any suitable combination thereof, during execution thereof by the machine 900. Accordingly, in various embodiments, the main memory 914, the static memory, and the processors 904 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 910. The term "machine-readable medium" shall also be taken to include any medium, or combination of multiple media, that is capable of storing instructions (e.g., instructions 910) for execution by a machine (e.g., machine 900), such that the instructions 910, when executed by one or more processors of the machine 900 (e.g., processors 904), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 918 include a wide variety of components to receive input, provide output, produce output, transmit information, exchange information, capture measurements, and so on. In general, it will be appreciated that the I/O components 918 can include many other components that are not shown in FIG. 9. The I/O components 918 are grouped according to functionality merely for simplifying the following discussion, and the grouping is in no way limiting. In various example embodiments, the I/O components 918 include output components 926 and input components 928. The output components 926 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 928 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 918 include biometric components 930, motion components 934, environmental components 936, or position components 938, among a wide array of other components. For example, the biometric components 930 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 938 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 918 may include communication components 940 operable to couple the machine 900 to a network 932 or devices 920 via a coupling 924 and a coupling 922, respectively. For example, the communication components 940 include a network interface component or another suitable device to interface with the network 932. In further examples, communication components 940 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 920 may be another machine 900 or any of a wide variety of peripheral devices (e.g., a peripheral device coupled via a Universal Serial Bus (USB)).

Moreover, in some embodiments, the communication components 940 detect identifiers or include components operable to detect identifiers. For example, the communication components 940 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 940, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 932 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 932 or a portion of the network 932 may include a wireless or cellular network, and the coupling 924 may be a Code Division Multiple Access (CDMA) connection, a Global System for Mobile communications (GSM) connection, or another type of cellular or wireless coupling. In this example, the coupling 922 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 910 are transmitted or received over the network 932 using a transmission medium via a network interface device (e.g., a network interface component included in the communication components 940) and utilizing any one of a number of well-known transfer protocols (e.g., Hypertext Transfer Protocol (HTTP)). Similarly, in other example embodiments, the instructions 910 are transmitted or received using a transmission medium via the coupling 922 (e.g., a peer-to-peer coupling) to the devices 920. The term "transmission medium" shall be taken to include any intangible medium that is capable of storing, encoding, or carrying the instructions 910 for execution by the machine 900, and includes digital or analog communications signals or other intangible media to facilitate communication of such software.

Furthermore, the machine-readable medium (e.g., memory/storage 906) is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, from a client device associated with a user, a request to determine a value for a subject real-estate property;
   searching a database to identify a plurality of real-estate properties that have previously been sold;
   identifying a first subset of the plurality of real-estate properties that have previously been sold that are each associated with a specified type of property characteristic;
   automatically generating, based on a sale price of each of the plurality of real-estate properties, the value for the subject real-estate property, the value for the subject real-estate property being generated based on sale prices of the first subset of the plurality of real-estate properties and sale prices of a remaining second subset of the plurality of real-estate properties;
   determining a first condition is satisfied by determining that a threshold is exceeded by a factor representing how much of the value generated for the subject real-estate property is based on sale prices of the first subset of the plurality of real-estate properties relative to sale prices of the second subset of the plurality of real-estate properties;
   conditioning generation of a prompt, for display on an operator device to cause the automatically generated value to be reviewed before the value is presented to the client device, on a plurality of conditions comprising the first condition and a second condition, the second condition being satisfied at least in part based on a likelihood that the user will complete a sale transaction for the subject real-estate property, such that the prompt is triggered for display in response to satisfaction of the plurality of conditions; and
   determining a likelihood that the user will sell the subject real-estate property at the automatically generated value based on a quantity of characteristics provided by the user about the subject real-estate property and whether one or more pictures of the subject real-estate property have been received from the client device of the user, the likelihood that the user will sell the subject real-estate property being determined by:
      causing a list of options representing levels of seriousness in selling the subject real-estate property on the client device of the user; and
      receiving from the client device a selection of an option representing a level of seriousness in selling the subject real-estate property from the list of options presented on the client device of the user.

2. The method of claim 1, wherein the sale price of each of the plurality of real-estate properties corresponds to a price at which each real-estate property previously closed or is listed for sale, wherein searching the database comprises:
   determining a geographical location of the subject real-estate property;
   selecting a sale time interval; and
   causing the database to search for the plurality of real-estate properties based on the geographical location of the subject real-estate property and based on the selected sale time interval.

3. The method of claim 1, wherein the likelihood that the user will sell the subject real-estate property is computed based on a user profile, and wherein automatically generating the value for the subject real-estate property comprises:
   assigning a weight to the sale price of each of the plurality of real-estate properties based at least in part on a measure of similarity between each of the plurality of real-estate properties and the subject real-estate property for which the request was received; and
   computing the value for the subject real-estate property as a function of the weighted sale prices of each of the plurality of real-estate properties.

4. The method of claim 3, further comprising:
   determining whether one or more of the identified plurality of real-estate properties is characterized as being a new construction to identify the first subset;
   in response to determining that one or more of the identified plurality of real-estate properties is characterized as being the new construction, retrieving the weight assigned to the sale price of the one or more of the identified plurality of real-estate properties; and computing a first value by aggregating the retrieved weights assigned to the sale price of the one or more of the identified plurality of real-estate properties characterized as being the new construction.

5. The method of claim 4 further comprising:

computing a second value by aggregating the retrieved weights assigned to each of the plurality of real-estate properties; and computing the factor as a ratio of the first value to the second value.

6. The method of claim 4, wherein the one or more real-estate properties is determined to be the new construction in response to determining that the one or more real-estate properties has been built within less than two years from a current date or has not been previously physically occupied.

7. The method of claim 1, further comprising defining the plurality of conditions for triggering display of the prompt, the plurality of conditions comprising a ratio of weights of the plurality of real-estate properties being new construction to a total number of weights of the plurality of real-estate properties exceeding a threshold, a minimum quantity of real-estate properties being included in the plurality of real-estate properties, and a measure of similarity between interior conditions of the real-estate properties relative to an interior condition of the subject real-estate property.

8. The method of claim 1, wherein the prompt comprises a section that lists the plurality of conditions that condition generation of the prompt, wherein the prompt is generated in response to a first set of the plurality of conditions being satisfied, wherein the first set of the plurality of conditions is visually distinguished from a second set of the plurality of conditions in response to conditionally presenting the prompt responsive to the first set of conditions being satisfied, the visually distinguished first set of the plurality of conditions visually indicate conditions that resulted in the generation of the prompt.

9. The method of claim 8, wherein the prompt comprises a plurality of action options, a first action option corresponding to approval of the automatically generated value, a second action option corresponding to modification of a model used to automatically generate the value, and a third action option corresponding to manual modification of the automatically generated value, wherein responsive to receiving selection of the first action option, the automatically generated value is provided to the client device, the client device being configured to display the automatically generated value with an option to sell the subject real-estate property at the automatically generated value.

10. The method of claim 1 further comprising:

computing a number representing how many real-estate properties are included in the plurality of real-estate properties;

determining whether the number exceeds a minimum number of real-estate properties needed to automatically generate the value; and causing the prompt to be displayed on the operator device in response to determining that the number fails to exceed the minimum number.

11. The method of claim 1 further comprising:

determining an interior condition of the subject real-estate property;

determining interior conditions of each of the plurality of real-estate properties to identify the first subset;

comparing the interior condition of the subject real-estate property to the interior conditions of each of the plurality of real-estate properties; and computing as the factor a difference resulting from comparing the interior condition of the subject real-estate property to the interior conditions of each of the plurality of real-estate properties.

12. The method of claim 1, further comprising:

training a neural network to predict an estimate of an error in the automatically generated value for the subject real-estate property, the neural network being trained to establish a relationship between one or more training real-estate property characteristics of training real-estate properties and corresponding errors in values of the training real-estate properties, the neural network being further trained by automatically computing sale prices for the training real-estate properties and computing an error value between the automatically computed sale prices and an actual sale price of the training real-estate properties.

13. The method of claim 12, further comprising computing an error measurement associated with the automatically generated value representing a level of difficulty in automatically generating the value based on the predicted estimate of the error.

14. The method of claim 13 further comprising causing the prompt to be displayed on the operator device before the value is presented to the user in response to determining that the error measurement exceeds an error threshold.

15. The method of claim 14 further comprising:

selecting, between first and second thresholds, the error threshold based on the likelihood that the user will complete the sale transaction.

16. The method of claim 15, wherein the first threshold is lower than the second threshold, and the method further comprises:

selecting the first threshold as the error threshold, in response to determining that the likelihood is greater than a given value indicating the user is serious about completing the sale transaction, to increase a likelihood that the prompt will be generated for display; and selecting the second threshold as the error threshold in response to determining that the likelihood is less than or equal to the given value.

17. A system comprising:

a memory that stores instructions; and one or more processors configured by the instructions to perform operations comprising:

receiving, from a client device associated with a user, a request to determine a value for a subject real-estate property;

searching a database to identify a plurality of real-estate properties that have previously been sold;

identifying a first subset of the plurality of real-estate properties that have previously been sold that are each associated with a specified type of property characteristic;

automatically generating, based on a sale price of each of the plurality of real-estate properties, the value for the subject real-estate property, the value for the subject real-estate property being generated based on sale prices of the first subset of the plurality of real-estate properties and sale prices of a remaining second subset of the plurality of real-estate properties;

determining a first condition is satisfied by determining that a threshold is exceeded by a factor representing how much of the value generated for the subject real-estate property is based on sale prices of the first subset of the plurality of real-estate properties relative to sale prices of the second subset of the plurality of real-estate properties;

conditioning generation of a prompt, for display on an operator device to cause the automatically generated value to be reviewed before the value is presented to the client device, on a plurality of conditions comprising the first condition and a second condition, the second condition being satisfied at least in part based on a likelihood that the user will complete a sale transaction for the subject real-estate property, such that the prompt is triggered for display in response to satisfaction of the plurality of conditions; and determining a likelihood that the user will sell the subject real-estate property at the automatically generated value based on a quantity of characteristics provided by the user about the subject real-estate property and whether one or more pictures of the subject real-estate property have been received from the client device of the user, the likelihood that the user will sell the subject real-estate property being determined by:
  causing a list of options representing levels of seriousness in selling the subject real-estate property on the client device of the user; and
  receiving from the client device a selection of an option representing a level of seriousness in selling the subject real-estate property from the list of options presented on the client device of the user.

18. The system of claim 17, wherein the operations further comprise:
  computing an error measurement associated with the automatically generated value representing a level of difficulty in automatically generating the value; and
  generating the prompt before the value is presented to the client device in response to determining that the error measurement exceeds an error threshold that is selected between first and second thresholds based on the likelihood.

19. A non-transitory computer-readable medium comprising instructions stored thereon that are executable by at least one processor to cause a computing device to perform operations comprising:
  receiving, from a client device associated with a user, a request to determine a value for a subject real-estate property;
  searching a database to identify a plurality of real-estate properties that have previously been sold;
  identifying a first subset of the plurality of real-estate properties that have previously been sold that are each associated with a specified type of property characteristic;
  automatically generating, based on a sale price of each of the plurality of real-estate properties, the value for the subject real-estate property, the value for the subject real-estate property being generated based on sale prices of the first subset of the plurality of real-estate properties and sale prices of a remaining second subset of the plurality of real-estate properties;
  determining a first condition is satisfied by determining that a threshold is exceeded by a factor representing how much of the value generated for the subject real-estate property is based on sale prices of the first subset of the plurality of real-estate properties relative to sale prices of the second subset of the plurality of real-estate properties;
  conditioning generation of a prompt, for display on an operator device to cause the automatically generated value to be reviewed before the value is presented to the client device, on a plurality of conditions comprising the first condition and a second condition, the second condition being satisfied at least in part based on a likelihood that the user will complete a sale transaction for the subject real-estate property, such that the prompt is triggered for display in response to satisfaction of the plurality of conditions; and
  determining a likelihood that the user will sell the subject real-estate property at the automatically generated value based on a quantity of characteristics provided by the user about the subject real-estate property and whether one or more pictures of the subject real-estate property have been received from the client device of the user, the likelihood that the user will sell the subject real-estate property being determined by:
    causing a list of options representing levels of seriousness in selling the subject real-estate property on the client device of the user; and
    receiving from the client device a selection of an option representing a level of seriousness in selling the subject real-estate property from the list of options presented on the client device of the user.

* * * * *